United States Patent [19]

Fitzpatrick

[11] Patent Number: 4,667,126
[45] Date of Patent: May 19, 1987

[54] THERMIONIC CONVERTER

[75] Inventor: Gary O. Fitzpatrick, Livermore, Calif.

[73] Assignee: Rasor Associates, Inc., Sunnyvale, Calif.

[21] Appl. No.: 444,736

[22] Filed: Nov. 26, 1982

[51] Int. Cl.⁴ .............................. H02N 7/00
[52] U.S. Cl. .................................... 310/306
[58] Field of Search ......................... 310/306

[56] References Cited

U.S. PATENT DOCUMENTS

| | | | |
|---|---|---|---|
| 2,915,652 | 12/1959 | Hatsopoulos et al. | 310/306 |
| 3,173,032 | 3/1965 | Maynard | 310/306 |
| 3,300,660 | 1/1967 | Bensimon | 310/306 |
| 3,322,978 | 5/1967 | Lary et al. | 310/306 |
| 3,439,193 | 4/1969 | Bensussan | 310/306 X |
| 3,515,908 | 6/1970 | Caldwell | 310/306 |
| 3,932,776 | 1/1976 | Dunlay et al. | 310/306 |

OTHER PUBLICATIONS

Angrist, *Direct Energy Conversion*, 1965, p. 233, Allyn & Bacon, Boston, Mass.

Primary Examiner—Donovan F. Duggan
Attorney, Agent, or Firm—Fliesler, Dubb, Meyer & Lovejoy

[57] ABSTRACT

A thermionic converter (10) is set forth which includes an envelope (12) having an electron collector structure (22) attached adjacent to a wall (16). An electron emitter structure (24) is positioned adjacent the collector structure (22) and spaced apart from opposite wall (14). The emitter (24) and collector (22) structures are in a common chamber (20). The emitter structure (24) is heated substantially only by thermal radiation. Very small interelectrode gaps (28) can be maintained utilizing the thermionic converter (10) whereby increased efficiency results.

5 Claims, 10 Drawing Figures

THERMIONIC CONVERTER

The Government has rights in this invention pursuant to Contract No. DE-AC02-76ET11293 awarded by the U.S. Department of Energy.

DESCRIPTION

1. Technical Field

This invention relates generally to the conversion of thermal energy to electrical energy utilizing a thermionic converter, and more particularly relates to a thermionic converter apparatus of improved efficiency and versatility.

2. Background Art

The conversion of heat to electricity utilizing a thermionic converter apparatus is very well known. In such an apparatus an electron emitter is heated by a heat source to a sufficient temperature so that it emits electrons into the surrounding space. An electron collector is located near the electron emitter and is at a lower temperature. The electrons emitted by the electron emitter are received by the electron collector. The circuit is completed by an external load. The space between the emitter and the collector is generally filled with low pressure gas, generally cesium vapor, so as to reduce space charge and the work function for emitting electrons from the electron emitter.

In present practice a single electrically and mechanically continuous emitter and similarly a single electrically and mechanically continuous collector are utilized within an individual converter envelope. This imposes severe design constraints. For example, very small converters suffer relatively large thermal losses between hot and cold surfaces if practical thicknesses are used for the envelope material. This occurs because heat losses through the envelope tend to decrease only linearly as the electrode diameter is reduced, while total thermal throughput is reduced inversely by the square of the diameter. To minimize the effect of such envelope losses it is also normal practice to use the electrical lead of the converter itself, which inherently imposes a thermal loss near 10%, as a portion of the envelope. Again, the practical limit on the thinness and length of such leads as envelope sections sets a minimum on converter size, typically near an electrode area of 2 sq.cm.

Present day ignited mode converters operate with a cesium atom density of $10^{16}$ (about 1 Torr) and a plasma density of about $10^{13}$ to $10^{14}$ per cubic centimeter in the interelectrode space. An arc drop (voltage loss) of 0.5 eV is required to maintain this plasma. It is possible to produce the ions for space charge neutralization in a thermionic converter more efficiently by emission from the hot emitter surface. However, the ion density produced in this way is relatively small except with high emitter temperatures (above about 2,000° K.). This type of unignited mode operation is particularly attractive at the low pressures and close electrode spacing which minimize electron scattering. If the pressure between the electrodes is maintained low enough so that the electron mean free path is greater than the interelectrode gap, electron transport occurs essentially without scattering. This type of discharge is known as Knudsen discharge.

It is known that operation in the Knudsen mode can lead to high performance. Power densities of 60 watts per square centimeter with a spacing of 0.1 mm (100 microns) and an emitter temperature of 2,770° K. have been reported. The conversion efficiency corresponding to that operating point is about 40%. A static direct conversion system which could produce this kind of power density and efficiency would be very attractive to produce high power for a short lifetime.

In the lowest pressure extreme of the Knudsen discharge operation, the vacuum space charge mode is reached. There are no interelectrode losses with the vacuum mode discharge; however, in order to obtain reasonable current densities, very close spacing (less than about 10 microns) between the electrodes is necessary. Operation in a vacuum mode with no plasma in the interelectrode space is understood theoretically, and the predicted performance approaches an ideal converter. However, maintainance of such a small spacing with high temperatures and heat fluxes is a difficult if not impossible technical challenge. The processes which lead to short circuits must be understood and accommodated in any practical design. For close spaced electrodes at high temperatures, whisker growth from the electrodes and impurities in the electrode space, may be some of the effects that contribute to short circuits. Design is thus needed which can tolerate contact between small portions of the electrode surfaces without disabling the entire converter structure.

DISCLOSURE OF THE INVENTION

The present invention is directed to overcoming one or more of the problems as set forth above.

In accordance with an embodiment of the present invention, a thermionic converter is provided which comprises an envelope having first and second walls spaced apart from one another. The envelope defines an enclosed chamber. An electron collector structure is attached adjacent to the second wall and an electron emitter structure is located adjacent the collector structure. At least a respective one of the collector and emitter structures comprises a plurality of elements. Each of such elements, along with a respective other of the collector and emitter structures, defines a plurality of interelectrode gaps at least when the emitter structure is above a selected temperature. The emitter structure is a spaced distance away from the first wall and is positioned to receive substantially only thermal radiation. Conducting means are provided for conducting electrons from the collector structure to external of the chamber and from external of the chamber to the emitter structure.

A thermionic converter as set out above has a number of advantages over prior art devices. For example, with the entire electrode pair array within a single envelope and with the emitter structure being heated substantially only by thermal radiation, uneven thermal expansion of the emitter structure is greatly reduced or eliminated. When the emitter or collector elements are relatively small, the interelectrode gaps can be made very small indeed thus allowing very efficient operation without significant development of shorts. The occasion of a short in any one electrode pair need not short all electrode pairs. The small size of the electrodes facilitates their production by low cost mass production techniques. Since the external envelope is spaced from the emitters it can be shaped as desired to attach it to any of various types of heat sources. Thus, a far more efficient versatile and low cost thermionic converter design results.

In accordance with another embodiment of the invention the first wall is required to be opaque but a plurality of elements is not required for either the collector or emitter structures. The opaque first wall reaches a very high temperature, sufficient to ionize a gas within the chamber, the ionized gas migrating to between the collector structure and the emitter structure to reduce space charge. The first wall can also be used as an electron source or sink to drive a discharge within the chamber, thereby generating ions which can migrate to between the collector structure and the emitter structure to reduce space charge.

BRIEF DESCRIPTION OF DRAWINGS

The invention will be better understood by reference to the figures of the drawings wherein.

BEST MODE FOR CARRYING OUT THE INVENTION

Figure 1:
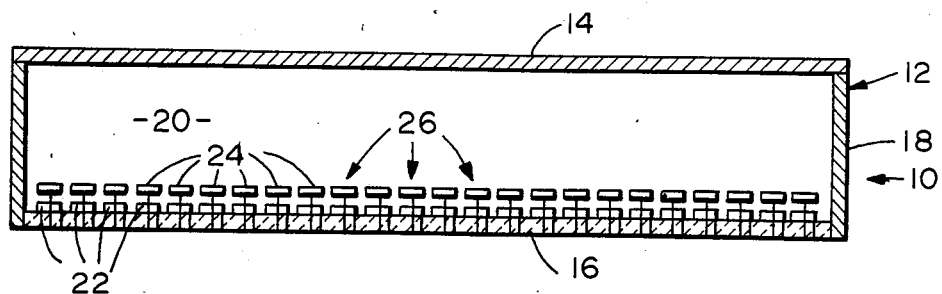
FIG. 1 illustrates a thermionic converter in accordance with an embodiment of the present invention.

Adverting to FIG. 1, a thermionic converter 10 is shown which includes an envelope 12 having a first wall 14 and a second wall 16 connected together by a side wall stucture 18. The first wall 14, the second wall 16 and the side wall structure 18 define an enclosed chamber 20 within the envelope 12.

Figure 2:
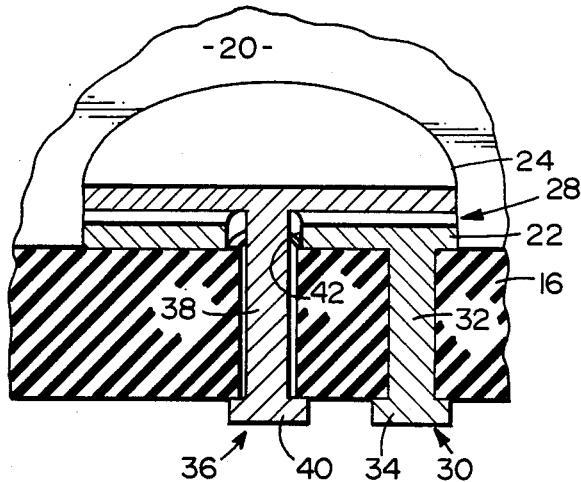
FIG. 2 illustrates, in section, a detail in the structure shown in FIG. 1.

A plurality of electron collectors 22 are attached adjacent to the second wall 16, which second wall 16 is of an electrically insulating material. Generally, the electron collectors 22 are attached directly to the second wall 16 as illustrated in FIGS. 1 and 2. A plurality of electron emitters 24 are provided, each located adjacent and forming respective electrode pairs 26 with respective of the collectors 22. The electrode pairs 26 define a plurality of interelectrode gaps 28 best seen in FIG. 2. The emitters 24 are located a spaced distance away from the first wall 14 and are positioned to receive substantially only thermal radiation. Such thermal radiation is emitted or transmitted primarily or exclusively by the first wall 14. In this manner, the emitters 24 are all heated relatively uniformly over their entire surfaces, thus decreasing or eliminating their tendency to buckle when heated nonuniformly as by conduction.

Adverting now principally to FIG. 2, first conducting means 30 are illustrated for conducting electrons from the plurality of collectors 22 to external of the chamber 20. In the particular embodiment illustrated in FIG. 2 each of the collectors 22 is attached to the second wall 14 and includes a first conductor 32 which proceeds through the second wall 16 and is connected to a first bus 34.

Second conducting means 36 are provided for conducting electrons from external of the chamber 20 to the plurality of emitters 24. As may be seen in FIG. 2, the second conducting means 36 in the embodiment illustrated includes a second conductor 38 leading from a second bus 40 to a respective one of the emitters 24. The second conductor 38 passes through the second wall 16 and also passes through a centrally located hole 42 in the respective collector 22. In accordance with a preferred embodiment of the invention, the conductors 38 are of a construction sufficient to fully support the emitters 24 and to provide the desired interelectrode gaps 28 at temperatures above the aforementioned selected temperature. As the emitters 24 are radiantly heated by thermal radiation proceeding from the first wall 14, the conductors 38 are heated and linearly expand sufficiently to provide the desired gap 28. In practice, the collectors 22 and emitters 24 may be in contact below the selected temperature. Alternately, a small gap 28 may exist even at room temperature and such small gap may be partially filled, if desired, with insulating spacer material.

It is preferred that the emitters 24 and the collectors 22 be no more than about 2 cm. across. When such small emitters 24 and collectors 22 are used, the parallel expansions of the emitters 24 and collectors 22 on being heated to operating temperature can be smaller than the relatively small interelectrode gaps 28. For example, such relative parallel expansions of the emitters 24 and collectors 22 are generally less than about $10^{-2}$ cm and more generally less than about $10^{-3}$ cm and the electrode gaps are generally between about $10^{-3}$ cm and $10^{-2}$ cm. Therefore, if any dirt particles are entrapped in the respective interelectrode gaps 28, they are not ploughed sideways sufficiently to gouge out metal and cause a short across the gap 28, as has occurred in prior art close spaced converter designs.

Figure 4:
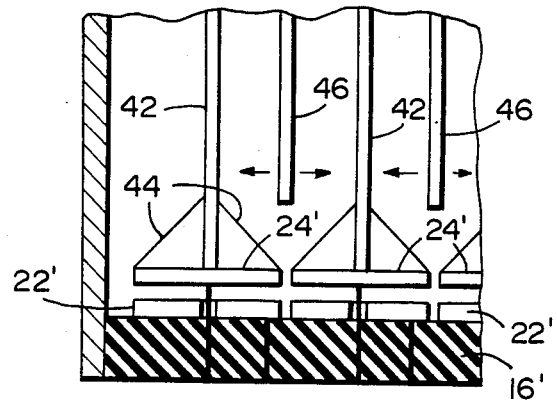
FIG. 4 illustrates an alternate embodiment of the present invention adapted for more efficient radiant heat transfer.

FIG. 4 illustrates an embodiment of the invention wherein a plurality of fins 42 extend from the respective emitters 24a. Appropriate gussets 44 are provided to uniformly distribute radiant heat picked up by the fins 42 to the respective emitters 24a. The fins 42 in the embodiment of the invention as illustrated in FIG. 4 extend generally towards the first wall 14 and the first wall 14 includes a plurality of interspaced fins 46 which extend towards the emitters 24a, the interspaced fins 46 being positioned between and spaced from respective of the fins 42. This allows more efficient transfer of radiant energy from the first wall 14 to the emitters 24a. While FIG. 4 illustrates a particular geometry for the fins 42 it is to be understood that fins of various shapes and alignments may be attached to the emitters 24, with or without the use of the interspaced fins 46.

Figure 3:
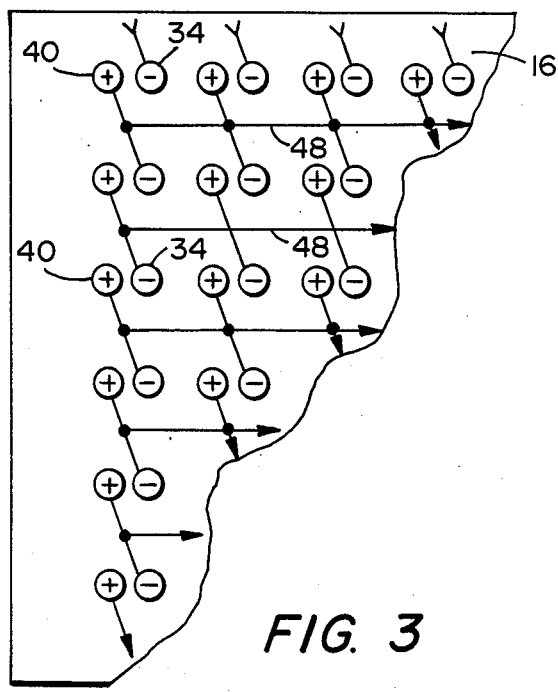
FIG. 3 illustrates, partially schematically, a partial bottom view of the embodiment shown in FIG. 1.

FIG. 3 illustrates an embodiment of the invention wherein a plurality of conductors 48 serve for connecting the electrode pairs 26 in a series-parallel array. It is obvious that the electrode pairs 26 may be connected either internally of the chamber 20 or externally of the vessel 12 in series, in parallel, or in series-parallel. The series-parallel arrangement is particularly advantageous in that it continues to supply power even if some of the electrode pairs 26 fail.

The chamber 20 normally includes a gas at a pressure selected to provide a reduced work function for removal of electrons from the emitters 24 and a reduced work function for their collection at the collectors 22.

Generally, the gas will be an alkali metal. A low pressure of oxygen may be used along with the gas. Normally the gas will include cesium as is customary with thermionic converters. With the very small gaps 28 which are attainable in accordance with the preferred embodiments of the present invention the gas pressure may be much lower than that normally utilized for thermionic converters. Indeed, it is not necessary to have sufficient gas present to reduce space charge since the interelectrode gaps 28 are so small that insufficient space charge exists there to limit the flow of electrons across the gaps. Alternately, the use of a higher pressure of gas than that normally used is possible using the converters of the present invention, since the gaps 28 can be so small as to reduce the scattering of electrons by the gas as the slectrons cross the gaps 28. At times a higher gas pressure is desirable so as to control adequately the electrode work functions and/or to thermally produce ions.

Figure 5:
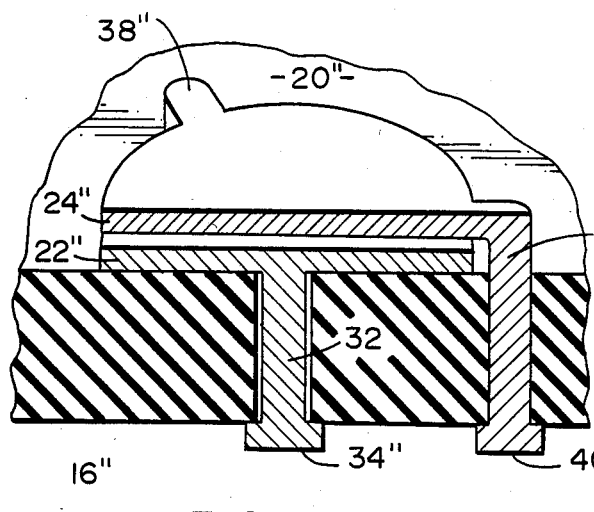
FIG. 5 illustrates a first alternate embodiment to the structure shown in FIG. 2.

FIG. 5 illustrates an alternate embodiment of the invention wherein collectors 22b are connected via a first conductor 32b to a first bus 34b. The emitters 24b are connected via a second conductor 38b, and more generally via a plurality of generally equally spaced second conductors 38b to respected buses 40b. The second conductors 38b thus pass peripherally around the collectors 22b.

Figure 6:
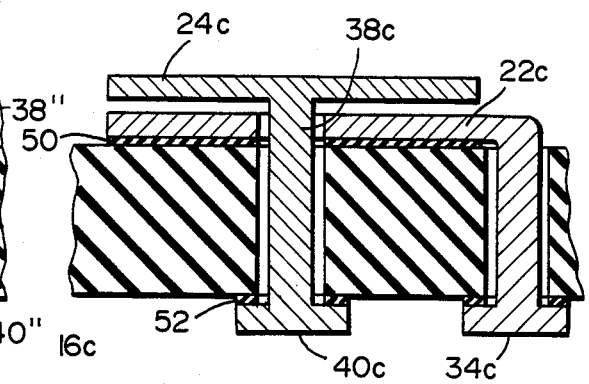
FIG. 6 illustrates a second alternate embodiment to the structure shown in FIG. 2.

FIG. 6 illustrates an embodiment wherein the second wall 16c is a conductor and the collectors 22c are isolated from the second wall 16c by insulators 50. The buses 40c (for the emitters 24c) are isolated from the second wall 16c by insulators 52.

Figure 7:
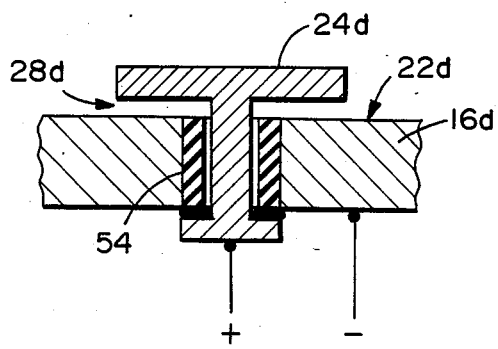
FIG. 7 illustrates a third alternate embodiment to the structure shown in FIG. 2.

FIG. 7 illustrates an embodiment wherein the collector structure 22d is the entire second wall 16d. Each of the emitters 24d is isolated from the second wall 16d by appropriate insulators 54. The elements of the converter 10 is thus connected in parallel.

Figure 8:
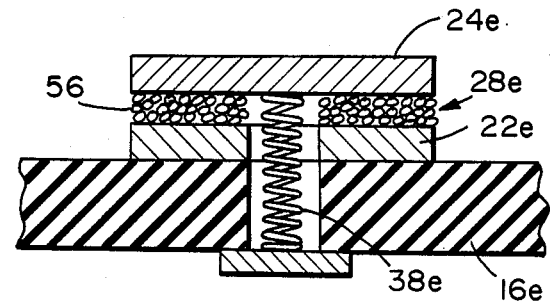
FIG. 8 illustrates a fourth alternate embodiment to the structure shown in FIG. 2.

FIG. 8 illustrates an embodiment wherein the gap 28e is determined by insulating spacers 56, e.g., alumina or beryllium oxide, and wherein the second conductor 38e is a weak spring holding the emitters 24e against the particles 56. The small size of the emitter electrodes permits such a structure with minimal force on the spacers 56 and, hence, minimal thermal conduction through the spacers 56, leading to higher efficiency and minimal distortion of the electrodes.

Figure 9:
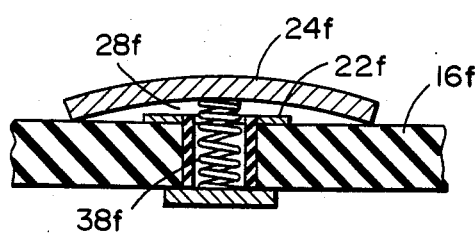
FIG. 9 illustrates a fifth alternate embodiment to the structure shown in FIG. 2.

FIG. 9 illustrates an embodiment wherein the gaps 28f are formed on bowing of the emitters 24f as they reach operating temperature. The second conductor 38f is a very weak spring so as to provide the necessary electrical connections when the emitters 24f are bowed. Similarly, the second wall 16f can be bowed either thermally or mechanically to provide the desired gaps 28f.

Figure 10:
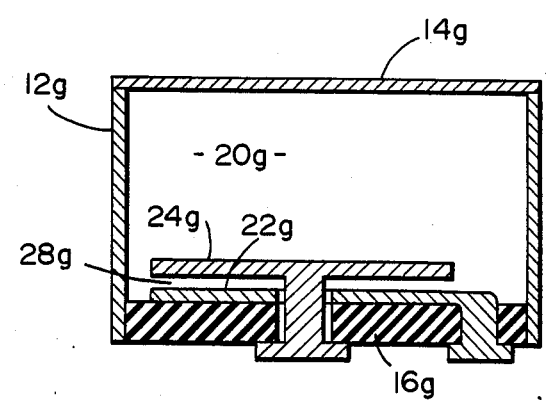
FIG. 10 illustrates an alternate embodiment adapted for more efficient operation with electrode gaps found in conventional thermionic converters.

FIG. 10 illustrates an embodiment wherein there is a single collector 22g and a single emitter 24g. The first wall 14g is opaque, whereby, since it is the portion of the apparatus which receives heat from a heat source, it is at the highest temperature during operation. The chamber 20g is filled with a gas or gas mixture at low pressure (less than 30 torr), e.g., cesium, barium or xenon. The first wall 14g can become hot enough to ionize the gas and the ions can then diffuse or circulate to the gap 28g, thus reducing space charge and increasing operating efficiency. If desired, a discharge can be initiated in the chamber 20g to provide ionized gas (not illustrated). The production of ions by such means can also be realized in the other embodiments of the invention.

INDUSTRIAL APPLICABILITY

A thermionic converter 10 in accordance with the present invention is useful for converting heat energy, e.g., from a furnace, solar concentrator or nuclear heat source or the like, directly into electrical energy in an improved and efficient manner. Because of the very small gaps 28 attainable between the emitters 24 and the collectors 22, the emitters 24 need be heated to a somewhat lower temperature than is necessary with prior art thermionic converters, allowing the use of less expensive materials of construction and extending the lifetime of the converter. Operation at the lower temperatures and higher efficiencies permitted by the invention can be accomplished with low heat fluxes through the converter, facilitating the use of the converter with available heat sources and heat sinks. Furthermore, the efficiency of the overall thermionic converter 10 is greater than that of prior art thermionic converters because it can operate with little or no arc drop.

I claim:

1. A thermionic converter (10) comprising:
   an envelope (12) having first (14) and second (16) walls (14,16) spaced apart from one another, said envelope (12) defining an enclosed chamber (20);
   an electron collector structure (22) attached adjacent to said second wall (16);
   an electron emitter structure (24), located adjacent said collector structure (22) and between said collector structure (22) and said first wall (12), at least a respective one (22 or 24) of said collector structure (22) and said emitter structure (24) comprising a plurality of elements (22 or 24), each of said elements (22 or 24) along with a respective other (24 or 22) of said collector structure (22) and said emitter structure (24) defining a plurality of interelectrode gaps (28) at least when said emitter structure (24) is above a selected temperature, said emitter structure (24) being a spaced distance away from said first wall (14) and being positioned to receive substantially only thermal radiation;
   first conducting means (30) for conducting electrons from said collector structure (22) to external of said chamber (20); and
   second conducting means (36) for conducting electrons from external of said chamber (20) to said of emitter structure (24);
   wherein said collector structure (22) and said emitter structure (24) each comprise a plurality of elements (22 and 24),
   wherein said collectors (22) include centrally located holes (42) therethrough and wherein said second conducting means (36) includes a plurality of second conductors (38) extending from respective of said emitters (24) through respective of said holes (42) without contacting said collectors (22) and through said second wall (16).

2. A converter (10) as set forth in claim 1 wherein said second conductors (38) are of a construction sufficient to fully support said emitters (24).

3. A thermionic converter (10) comprising:
   an envelope (12) having first (14) and second (16) walls (14,16) spaced apart from one another, said envelope (12) defining an enclosed chamber (20);
   an electron collector structure (22) attached adjacent to said second wall (16);

an electron emitter structure (24), located adjacent said collector structure (22) and between said collector structure (22) and said first wall (12), at least a respective one (22 or 24) of said collector structure (22) and said emitter structure (24) comprising a plurality of elements (22 or 24), each of said elements (22 or 24) along with a respective other (24 or 22) of said collector structure (22) and said emitter structure (24) defining a plurality of interelectrode gaps (28) at least when said emitter structure (24) is above a selected temperature, said emitter structure (24) being a spaced distance away from said first wall (14) and being positioned to receive substantially only thermal radiation;

first conducting means (30) for conducting electrons from said collector structure (22) to external of said chamber (20); and second conducting means (36) for conducting electrons from external of said chamber (20) to said of emitter structure (24);

wherein said collector structure (22) and said emitter structure (24) each comprise a plurality of elements (22 and 24), wherein said second conducting means (36) includes a plurality of second conductors (38) extending from respective of said emitters (24) through said second wall (16), said second conductors (38) being of a construction sufficient to fully support said emitters (24) and to provide said interelectrode gaps (28) of a desired size at temperatures above said selected temperature.

4. A thermionic converter (10) comprising:

an envelope (12) having first (14) and second (16) walls (14,16) spaced apart from one another, said envelope (12) defining an enclosed chamber (20);

an electron collector structure (22) attached adjacent to said second wall (16);

an electron emitter structure (24), located adjacent said collector structure (22) and between said collector structure (22) and said first wall (12), at least a respective one (22 or 24) of said collector structure (22) and said emitter structure (24) comprising a plurality of elements (22 or 24), each of said elements (22 or 24) along with a respective other (24 or 22) of said collector structure (22) and said emitter structure (24) defining a plurality of interelectrode gaps (28) at least when said emitter structure (24) is above a selected temperature, said emitter structure (24) being a spaced distance away from said first wall (14) and being positioned to receive substantially only thermal radiation;

first conducting means (30) for conducting electrons from said collector structure (22) to external of said chamber (20); and second conducting means (36) for conducting electrons from external of said chamber (20) to said of emitter structure (24);

wherein said collector structure (22) and said emitter structure (24) each comprise a plurality of elements (22 and 24);

wherein said electrode gaps (28) are larger than the differences in relative parallel expansions of said emitters (24) and collectors (22) on being heated to operating temperature;

wherein said emitters (24) and said collectors (22) are each no more than about 1 cm across;

wherein said interelectrode gaps (28) are no more than about $10^{-2}$ cm; and further including:

fins (42) extending from said emitters (24).

5. A converter (10) as set forth in claim 4, wherein said fins (42) extend generally towards said first wall (14) and wherein said first wall (14) includes a plurality of interspaced fins (46) extending generally towards said emitters (24a), said interspaced fins (46) being positioned between and spaced from respective of said fins (42).

* * * * *